US012772205B2

(12) United States Patent
Li

(10) Patent No.: US 12,772,205 B2
(45) Date of Patent: Oct. 20, 2026

(54) METHOD AND APPARATUS FOR DETERMINING PAGING MONITORING PARAMETER, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 320 days.

(21) Appl. No.: 18/294,037

(22) PCT Filed: Aug. 4, 2021

(86) PCT No.: PCT/CN2021/110649
§ 371 (c)(1),
(2) Date: Jan. 31, 2024

(87) PCT Pub. No.: WO2023/010353
PCT Pub. Date: Feb. 9, 2023

(65) Prior Publication Data
US 2025/0089018 A1 Mar. 13, 2025

(51) Int. Cl.
*H04W 68/02* (2009.01)
*H04W 76/28* (2018.01)

(52) U.S. Cl.
CPC .......... *H04W 68/02* (2013.01); *H04W 76/28* (2018.02)

(58) Field of Classification Search
CPC ... H04W 68/00; H04W 68/02; H04W 68/005; H04W 76/28; H04W 52/02; H04W 52/0216; H04W 76/27; Y02D 30/70
See application file for complete search history.

(56) References Cited

U.S. PATENT DOCUMENTS

| | | | | |
|---|---|---|---|---|
| 2022/0225182 | A1* | 7/2022 | Tan | H04W 36/0058 |
| 2023/0292288 | A1* | 9/2023 | Al | H04W 68/02 |
| 2024/0107625 | A1* | 3/2024 | Sogabe | H04W 76/28 |

FOREIGN PATENT DOCUMENTS

| | | | |
|---|---|---|---|
| JP | 2020532146 | A | 11/2020 |
| JP | 2022189516 | A | 12/2022 |
| WO | WO 2020147669 | A1 | 7/2020 |

OTHER PUBLICATIONS

Convida Wireless, "Impact of eDRX PTW for Reduced Capability NR Devices", 3GPP TSG-RAN WG2 Meetin #113, R2-2101797, 2 pages , 2021 (Year: 2021).*

Intel Corporation, "Leftover issues for eDRX", 3GPP TSG RAN WG2 Meeting #114, R2-2104929, Electronic meeting, May 19-27, 2021, R2-2104929, 5 pages.

Huawei, HiSilicon, "eDRX for RedCap UE", 3GPP TSG-RAN WG2 Meeting #114e, R2-2105636, Electronic, May 12-20, 2021, 6 pages.

(Continued)

*Primary Examiner* — Quoc Thai N Vu

(74) *Attorney, Agent, or Firm* — Finnegan, Henderson, Farabow, Garrett & Dunner, L.L.P.

(57) ABSTRACT

A method for determining a paging monitoring parameter is performed by a user equipment (UE), and includes: determining a paging monitoring parameter of an inactive-state UE according to a configuration situation of an inactive-state extended Discontinuous Reception (eDRX) parameter and an idle-state eDRX parameter.

19 Claims, 4 Drawing Sheets

(56) References Cited

OTHER PUBLICATIONS

Ericsson, "PTW configuration and minimum cycle length for eDRX", 3GPP TSG-RAN WG2 #114-e, Tdoc R2-2105236, Revision of R2-2102965, Electronic meeting, May 19-27, 8 pages.
Extended European Search Report issued in Application No. 21952253.9 dated Jul. 17, 2024, 12 pages.
Office Action for Russian Application No. 2024104842/07 issued on Aug. 15, 2024, 13 pages.
Notice of Reasons for Refusal for Japanese Patent Application No. 2024-506830 issued on Dec. 24, 2024, 25 pages.
Intel Corporation, "Summary of offline 101—[REDCAP] eDRX cycles—second round", 3GPP TSG RAN WG2 Meeting #113bis-e, R2-2104367, Electronic meeting, Apr. 12-20, 2021, 36 pages.
International Search Report and Written Opinion of International Application No. PCT/CN2021/110649, dated Apr. 29, 2022, 12 pages.
ZTE Corportion, "FFSs for supporting short eDRX in RRC_INACTIVE for eMTC in 5GC", 3GPP TSG-RAN WG2 Meeting #109, electronic R2-2001211, Elbonia, Feb. 24-Mar. 6, 2020, 5 pages.

* cited by examiner

METHOD AND APPARATUS FOR DETERMINING PAGING MONITORING PARAMETER, COMMUNICATION DEVICE, AND STORAGE MEDIUM

CROSS REFERENCE TO RELATED APPLICATIONS

This application is a U.S. national phase of International Application No. PCT/CN2021/110649, filed on Aug. 4, 2021, the entire contents of which are incorporated herein by reference.

TECHNICAL FIELD

The present disclosure relates to, but is not limited to, a field of wireless communication technology, the field of wireless communication technology, particularly to a method and an apparatus for determining a paging monitoring parameter, a communication device, and a storage medium.

BACKGROUND

User Equipment (UE) balances low-power services and services having a certain requirement for latency. During each extended Discontinuous Reception (eDRX) cycle, the UE can receive downlink data only within a set Paging Time Window (PTW), and the terminal is in a sleep mode and the UE does not receive the downlink data. This eDRX mode achieves a balance between latency of a downlink service and power consumption, such as remotely shutting down a gas service through a specific intelligent terminal. If the specific intelligent terminal is in this eDRX mode, it can realize service implementation while also saving the power consumption of the specific intelligent terminal as much as possible.

Within each eDRX cycle that is greater than a certain duration, a PTW can be set, and the UE can monitor a paging channel according to a Discontinuous Reception (DRX) cycle within the PTW to receive the downlink data, and the terminal is in the sleep mode for the rest of the time.

SUMMARY

A first aspect of embodiments of the present disclosure provides a method for determining a paging monitoring parameter performed by a use equipment (UE), and the method includes:

- determining a paging monitoring parameter of an inactive-state UE according to a configuration situation of an inactive-state extended Discontinuous Reception (eDRX) parameter and an idle-state eDRX parameter.

A second aspect of embodiment of the present disclosure provides a communication device, including: a processor, a transceiver, a memory, and an executable program stored on the memory and executable by the processor. When the processor executes the executable program, the processor performs the method for determining a paging monitoring parameter provided in the first aspect.

A third aspect of embodiment of the present disclosure provides a computer storage medium. The computer storage medium stores an executable program. After the executable program is executed by a processor, the method for determining a paging monitoring parameter provided in the first aspect can be implemented.

It should be understood that the above general description and following detailed description are only illustrative and explanatory, and do not limit embodiments of the disclosure.

BRIEF DESCRIPTION OF THE DRAWINGS

The accompanying drawings, which are incorporated in and constitute a part of the description, illustrate embodiments consistent with the disclosure and together with the description serve to explain the principles of embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of the exemplary embodiments do not represent all implementations consistent with embodiments of the disclosure. Instead, they are merely examples of apparatuses and methods consistent with aspects of the embodiments of the disclosure as recited in the appended claims.

The terms used in embodiments of the disclosure are only for the purpose of describing specific embodiments, and are not intended to limit the embodiments of the disclosure. The singular forms of "a" and "the" used in the embodiments of the disclosure and the appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
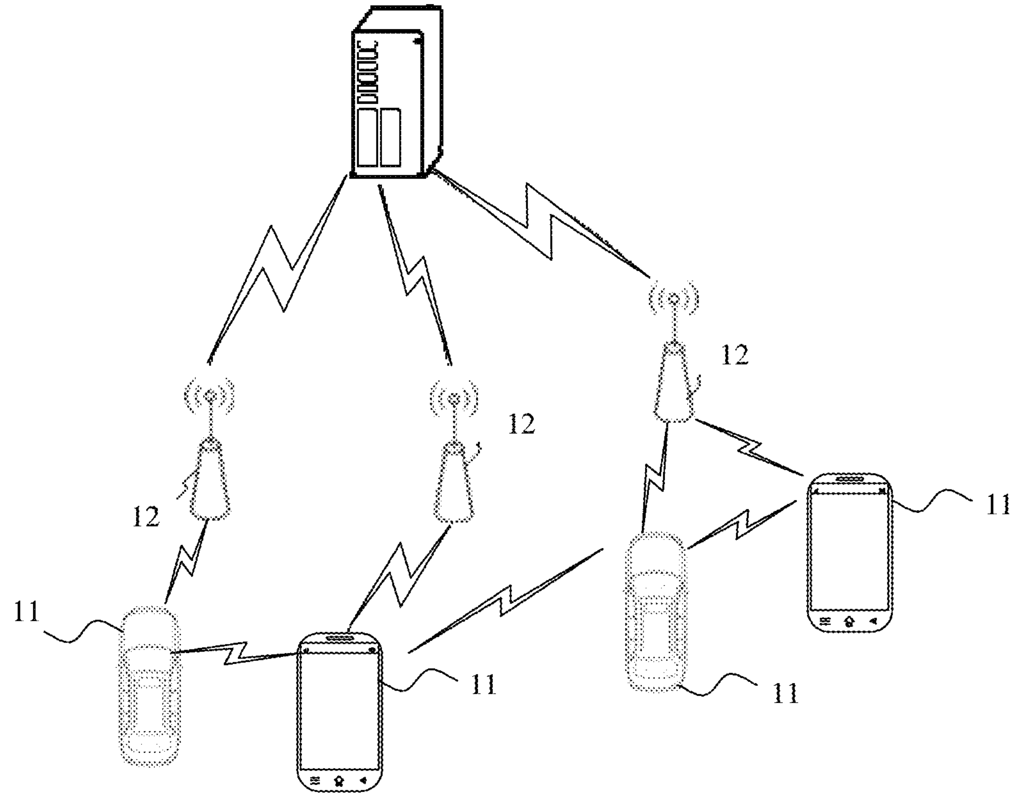
FIG. 1 is a schematic diagram illustrating a wireless communication system according to an embodiment of the disclosure.

FIG. 1 illustrates a schematic diagram illustrating a wireless communication system according to an embodiment of the disclosure. As illustrated in FIG. 1, the wireless communication system is a communication system based on cellular mobile communication technology. The communication system can include several user equipment (UE) 11 and several access devices 12.

The UE 11 can be a device that provides voice and/or data connectivity to a user. The UE 11 can communicate with one or more core networks (CNs) through a Radio Access Network (RAN). The UE 11 can be an Internet of Things (IoT) UE, such as a sensor device, a mobile phone (or a "cellular" phone), or a computer with an IoT UE, such as a fixed, portable, pocket, handheld, computer built-in, or in-vehicle device. For example, the UE may be a station (STA), a subscriber unit, a subscriber station, a mobile station, a mobile, a remote station, an access point, a remote UE (a remote terminal), an access UE (an access terminal), a user terminal, a user agent, a user device, or a UE. Alternatively, the UE 11 can also be a device for an unmanned aerial vehicle. Alternatively, the UE 11 can also be an onboard device, such as an onboard computer having a wireless communication function or a wireless communication device external to an electronic control unit (ECU). Alternatively, UE 11 can also be a roadside device, such as a street light, a signal light, or other roadside device with a wireless communication function.

The access device 12 may be a network side device in the wireless communication system. The wireless communication system can be the fourth generation mobile communication (4G) system, also known as a Long Term Evolution (LTE) system. Alternatively, the wireless communication system can also be a 5G system, also known as a new radio (NR) system or a 5G NR system. Alternatively, the wireless communication system can also be a next generation system of the 5G system. An access network in the 5G system can be referred to as an NG-RAN (New Generation Radio Access Network). Alternatively, the wireless communication system can also be a Machine Type Communication (MTC) system.

The access device 12 can be an evolved access device (eNB) used in the 4G system. Alternatively, the access device 12 can also be an access device (gNB) adopting a centralized distributed architecture in the 5G system. When the access device 12 adopts the centralized distributed architecture, it usually includes a central unit (CU) and at least two distributed units (DU). The centralized unit is equipped with protocol stacks of a Packet Data Convergence Protocol (PDCP) layer, a Radio Link Control (RLC) layer, and a Media Access Control (MAC) layer. The distributed unit is equipped with a protocol stack of a physical (PHY) layer. A specific implementation of the access device 12 is not limited in embodiments the disclosure.

A wireless connection can be established between the access device 12 and the UE 11 through a radio air interface. In different implementations, the radio air interface is a radio air interface based on the fourth-generation mobile communication network technology (4G) standard. Alternatively, the radio air interface is a radio air interface based on the fifth-generation mobile communication network technology (5G) standard, such as a new radio air interface. Alternatively, the radio air interface can also be a radio air interface based on the next-generation mobile communication network technology standard of the 5G.

In some embodiments, an E2E (End to End) connection may be established between UEs 11, for example, in scenarios such as V2V (vehicle to vehicle) communication, V2I (vehicle to infrastructure) communication, and V2P (vehicle to pedestrian) communication in vehicle to everything (V2X) communication.

In some embodiments, the above wireless communication system may also include a network management device 13.

The several access devices 12 are respectively connected to the network management device 13. The network management device 13 can be a core network device in the wireless communication system. For example, the network management device 13 can be a Mobility Management Entity (MME) in an Evolved Packet Core (EPC). Alternatively, the network management device can also be other core network devices, such as a Service GateWay (SGW), a Public Data Network GateWay (PGW), a Policy and Charging Rules Function (PCRF), or a Home Subscription Server (HSS). The implementation form of the network management device 13 is not limited by embodiment of the disclosure.

If the UE enables an extended Discontinuous Reception (eDRX) function, the UE may enter an eDRX mode. The UE in the eDRX mode has the following characteristics:

The UE can be reached at any time, but a reach delay is large, and the delay depends on a configuration of an eDRX cycle.

In this way, the UE whose eDRX function is enabled achieves a balance between UE power consumption and timeliness of data transmission to the greatest extent.

The eDRX function has one or more of the following eDRX parameters:

a starting time-domain position of a Paging Time Window (PTW);

a length of the PTW;

an eDRX cycle, which can be represented by $T_{eDRX,\ H}$.

Figure 2:
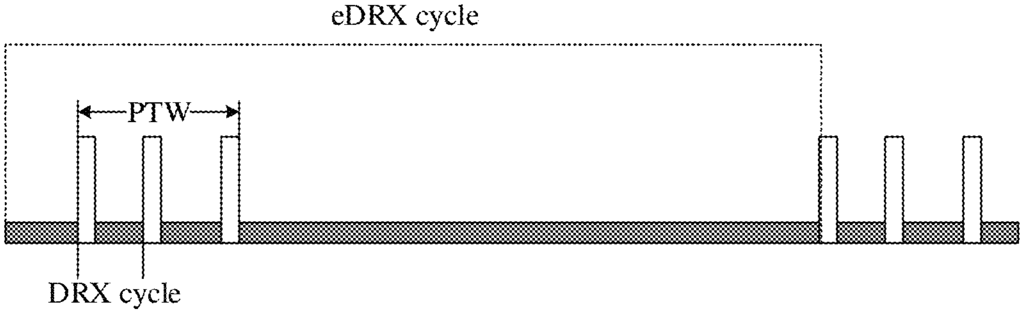
FIG. 2 is a timing diagram of performing an extended Discontinuous Reception (eDRX) function according to an embodiment of the disclosure.

FIG. 2 shows a timing diagram after a UE activates an eDRX function.

Referring to FIG. 2, it can be seen that there is a PTW within one eDRX cycle. There are one or more DRX cycles in the PTW.

A duration of the DRX cycle can be smaller (or even much smaller) than a duration of the eDRX cycle.

Figure 3:
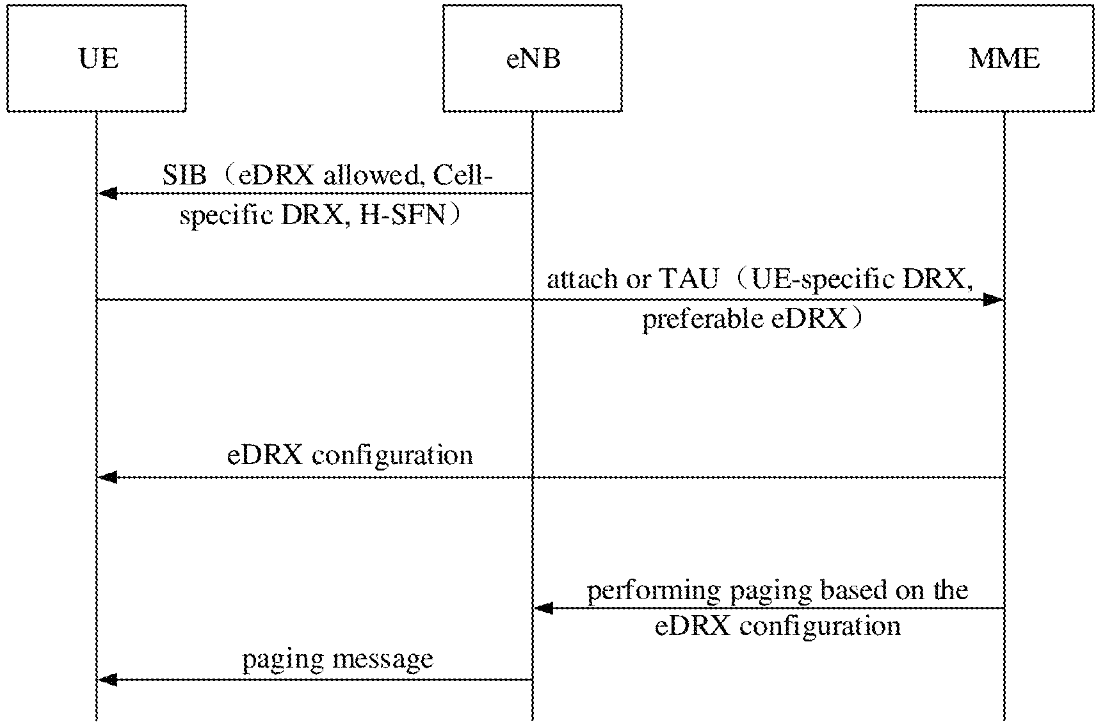
FIG. 3 is a schematic diagram illustrating interaction of configuring an idle-state e-DRX function with a core network according to an embodiment of the disclosure.

FIG. 3 shows one of interacting an eDRX parameter of the eDRX function between a UE and a core network.

It is noted that, when an eDRX cycle is greater than 10.24 seconds, a PTW may be set within the eDRX cycle.

A method for interacting the eDRX parameter between the UE and the core network shown in FIG. 3 may include following.

An eNB sends an indication of an allowed eDRX function (eDRX allowed), an indication of a specific cell (Cell-specific DRX), and a Hyper system Frame Number (H-SFN) to the UE through a System Information Block (SIB).

The UE sends a UE-specific DRX parameter (UE-specific DRX) and/or a preferable eDRX parameter (preferable eDRX) on an attachment (attach) request or a Tracking Area Update (TAU) request.

After receiving the attachment request or the TAU request, an MME issues an eDRX configuration to the UE. The eDRX configuration carries the one or more eDRX parameters.

The MME performs paging based on the eDRX configuration.

After receiving a CN paging message sent by the MME, the eNB forwards the CN paging message to the UE. For example, the MME of the core network sends the eDRX parameter of the eDRX function to the UE through the eNB.

The eDRX parameter issued by the core network is transparently transmitted to the UE through a base station (such as an evolved base station (eNB) or a next-generation base station (gNB)). For example, the MME of the core network sends the eDRX parameter of the eDRX function to the UE through the eNB.

A radio resource control (RRC) idle state, abbreviated as an idle state, is a low-power state of the UE known to the core network.

An RRC inactive state, abbreviated as an inactive state, is a low-power state of the UE that is transparent to the core network. In contrast, the inactive state is visible to an access network.

If the UE enters the inactive state, the UE may receive a paging message (i.e. the CN paging message) sent by the CN, as well as a paging message sent by a Radio Access Network (RAN), i.e. a RAN paging message.

Figure 4:
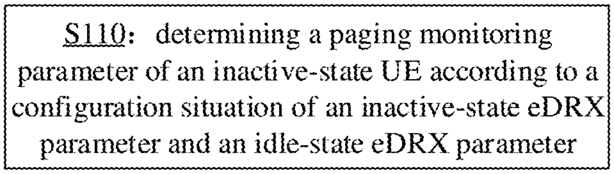
FIG. 4 is a flowchart diagram illustrating a method for determining a paging monitoring parameter according to an embodiment of the disclosure.

As shown in FIG. 4, embodiments of the present disclosure provide a method for determining a paging monitoring parameter. The method is performed by a UE, and includes the followings.

S110, a paging monitoring parameter of an inactive-state UE is determined according to a configuration situation of an inactive-state eDRX parameter and an idle-state eDRX parameter.

The UE can be of various types. For example, the UE may be a mobile phone, a tablet, a wearable device, a smart home device, a smart office device, or an in-vehicle device.

In embodiments of the disclosure, the UE is in an inactive state, which can be referred to as an inactive-state UE.

Both the inactive-state eDRX parameter and the idle-state eDRX parameter can be issued by a network side or determined based on a communication protocol.

In an embodiment, the idle-state eDRX parameter may be issued by a core network, and the inactive-state eDRX parameter may be issued by an access network.

In embodiments of the disclosure, the inactive-state UE may determine its own paging monitoring parameter for monitoring a paging message according to the configuration situation of its own inactive-state eDRX parameters and idle-state eDRX parameter.

The inactive-state eDRX parameter may include an inactive-state eDRX cycle. In some embodiments, the inactive-state eDRX parameter may further include an inactive-state PTW The idle-state eDRX parameter may include an idle-state eDRX cycle. In some embodiments, the idle-state eDRX parameter may further include an idle-state PTW.

In embodiments of the disclosure, the inactive-state UE may determine its own paging monitoring parameter according to the configuration of its idle-state eDRX parameter and inactive-state eDRX parameter. The paging monitoring parameter may include at least one of the following:

a monitoring time window for paging messages; or a monitoring cycle for paging messages.

The inactive-state UE monitors a paging message sent by the network side based on the determined paging monitoring parameter.

The PTW defined in the idle-state eDRX parameter may also be known as an idle-state PTW or a first PTW. The PTW defined in the inactive-state eDRX parameter is also known as an inactive-state PTW or a second PTW.

Figure 5:
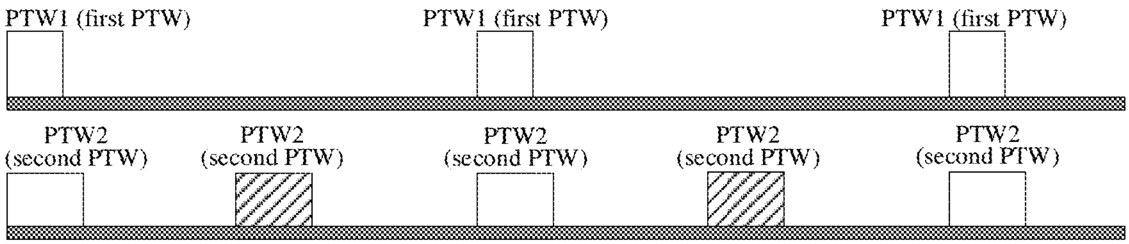
FIG. 5 is a schematic diagram illustrating a situation of a time-domain overlap between an idle-state PTW and an inactive-state PTW according to an embodiment of the disclosure.
Figure 6:
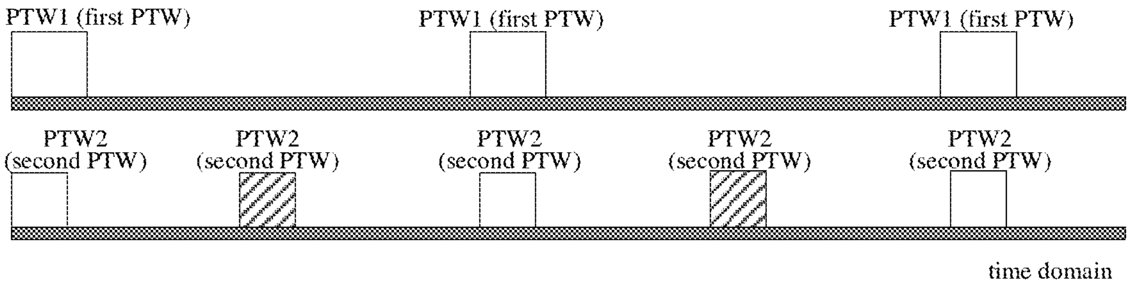
FIG. 6 is a schematic diagram illustrating a situation of a time-domain overlap between an idle-state PTW and an inactive-state PTW according to an embodiment of the disclosure.

Referring to FIG. 5 and FIG. 6, the idle-state PTW can be PTWT, which can be distributed periodically or nonperiodically in a time domain according to a duration of the idle-state eDRX cycle. The inactive-state PTW can be PTW2, and similarly, it can be distributed periodically or nonperiodically in the time domain according to a duration of the inactive-state eDRX cycle.

In some embodiments, determining the paging monitoring parameter of the inactive-state UE according to the configuration situation of the inactive-state eDRX parameter and the idle-state eDRX parameter includes at least one of:

in response to the idle-state eDRX parameter being configured and no inactive-state eDRX parameter being configured, determining the paging monitoring parameter of the inactive-state UE according to the idle-state eDRX parameter;

in response to the idle-state eDRX parameter being configured and the inactive-state eDRX parameter not including a PTW, determining the paging monitoring parameter of the inactive-state UE according to the idle-state eDRX parameter;

in response to the idle-state eDRX parameter being configured and the inactive-state eDRX parameter being configured, determining the paging monitoring parameter of the inactive-state UE according to a first PTW included in the idle-state eDRX parameter and a second PTW included in the inactive-state eDRX parameter. That is, if the inactive-state UE is configured with the inactive-state eDRX parameter, and the inactive-state UE is configured with the idle-state eDRX parameter, the paging monitoring parameter is determined according to the idle-state eDRX parameter. In some possible implementations, the paging monitoring parameter may indicate at least one of:

the first PTW, which is a time window for monitoring paging messages, and can be the PTW included in the idle-state eDRX parameter; or a monitoring cycle, which can be one of:

a CN paging cycle, which can be equal to an idle-state DRX cycle included in the first PTW;

a RAN paging cycle;

Min (the CN paging cycle, the RAN paging cycle, a default paging cycle);

Min (the CN paging cycle, the RAN paging cycle).

Min ( ) represents a minimum value of the objects in the parentheses.

The above are only examples, and the specific implementation is not limited to the above examples.

In some embodiments, the inactive-state UE is configured with the idle-state eDRX parameter and the inactive-state eDRX parameter, but the inactive-state eDRX parameter may be configured with no PTW. For example, the inactive-state eDRX cycle included in the inactive-state eDRX parameter is relatively small. For example, the inactive-state eDRX cycle is 2.56 s, 5.12 s, etc. In this case, the inactive-state eDRX parameter does not include a PTW. In addition, a possible reason for the inactive-state eDRX parameters not defining a PTW may be that the base station does not allocate a PTW for the inactive-state eDRX parameter based on implementation. In these cases, the inactive-state UE may monitor the paging messages according to the idle-state eDRX parameter, thus the paging monitoring parameter can be determined based on the idle-state eDRX parameter. For example, the first PTW included in the idle-state eDRX parameter is determined as a time window for monitoring the paging messages. For example, a paging cycle for monitoring the paging messages within the first PTW is determined based on the idle-state DRX cycle within the first PTW defined by the idle-state eDRX parameter.

Therefore, in this case, in response to the idle-state eDRX parameter being configured and the inactive-state eDRX parameters not including a PTW, the paging monitoring parameter of the inactive-state UE is determined according to the idle-state eDRX parameter, which may include: in response to the idle-state eDRX parameter being configured, the idle-state eDRX parameter defining that the first PTW is configured within the idle-state eDRX cycle, and the inactive-state eDRX parameters not including the second PTW, the paging monitoring parameter for monitoring the paging message within the first PTW is determined.

In an embodiment, the inactive-state UE is configured with the idle-state eDRX parameter and the inactive-state eDRX parameter. If the idle-state eDRX parameter is configured with the first PTW and the inactive-state eDRX parameter is not configured with a PTW, it is treated as if the terminal is only configured with the idle-state eDRX parameter. That is, the inactive-state eDRX parameter does not take effect. Processing according to the idle-state eDRX parameter may include: monitoring paging based on the PTW1 (i.e. the first PTW) defined by the idle-state eDRX parameter. For example, in S110, a paging monitoring parameter for the inactive-state UE to monitor a CN paging and/or a RAN paging within the PTW1.

In some embodiments, determining the paging monitoring parameter of the inactive-state UE according to the first PTW included in the idle-state eDRX parameter and the second PTW included in the inactive-state eDRX parameter includes:

in response to the first PTW being less than the second PTW, determining the paging monitoring parameter of the inactive-state UE according to the idle-state eDRX parameter.

Referring to FIG. 5, the first PTW being less than the second PTW means that a time-domain resource length of the first PTW is less than a time-domain resource length of the second PTW. If the first PTW is less than the second PTW, the paging monitoring parameter may be determined according to the idle-state eDRX parameter. As an embodiment, the inactive-state UE is configured with the idle-state eDRX parameter and the inactive-state eDRX parameter. However, if the first PTW is less than the second PTW, it is treated as if the terminal is only configured with the idle-state eDRX parameter. That is, the inactive-state eDRX parameter does not take effect. It can be determined that the first PTW being less than the second PTW is an illegal configuration of the inactive-state eDRX parameter.

For example, a monitoring time window indicated by the paging monitoring parameter may be the first PTW. The paging cycle for monitoring the paging messages within the first PTW may be at least one of the following:

- a CN paging cycle, which can be equal to an idle-state DRX cycle within the first PTW;
- a RAN paging cycle;
- Min (the CN paging cycle, the RAN paging cycle, a default paging cycle);
- Min (the CN paging cycle, the RAN paging cycle).

The above-mentioned Min (the CN paging cycle, the RAN paging cycle, the default paging cycle) or Min (the CN paging cycle, the RAN paging cycle) can be used as the paging cycle to enable the UE to monitor the paging messages with a small cycle, thereby reducing the missing of the paging messages and reducing repeated issuance of network-side paging messages.

In some embodiments, determining the paging monitoring parameter of the inactive-state UE according to the first PTW included in the idle-state eDRX parameter and the second PTW included in the inactive-state eDRX parameter further includes at least one of the following:

- in response to the first PTW being less than the second PTW and no time-domain overlap existing between the first PTW and the second PTW, determining a paging monitoring parameter for the inactive-state UE to monitor RAN paging within the second PTW;
- in response to the first PTW being less than the second PTW and no time-domain overlap existing between the first PTW and the second PTW, determining a paging monitoring parameter for the inactive-state UE to monitor RAN paging within the first PTW;
- in response to the first PTW being less than the second PTW and a time-domain overlap existing between the first PTW and the second PTW, determining a paging monitoring parameter for the inactive-state UE to stop monitoring the paging within the first PTW when the CN paging or the RAN paging is monitored once within the first PTW;
- in response to the first PTW being less than the second PTW and a time-domain overlap existing between the first PTW and the second PTW, determining a paging monitoring parameter for the inactive-state UE to stop monitoring the paging within the first PTW when the CN paging or the RAN paging is monitored once within the second PTW.

In some embodiments, determining the paging monitoring parameter of the inactive-state UE according to the first PTW included in the idle-state eDRX parameter and the second PTW included in the inactive-state eDRX parameter further includes at least one of the following:

- in response to the first PTW being less than the second PTW and no time-domain overlap existing between the first PTW and the second PTW, determining a paging monitoring parameter for the inactive-state UE to monitor the RAN paging within a time-domain position corresponding to the first PTW in the inactive-state eDRX cycle;
- in response to the first PTW being less than the second PTW and a time-domain overlap existing between the first PTW and the second PTW, determining a paging monitoring parameter for the inactive-state UE to monitor the CN paging and the RAN paging within the time-domain position corresponding to the first PTW in the inactive-state eDRX cycle;
- in response to the first PTW being less than the second PTW and a time-domain overlap existing between the first PTW and the second PTW, if the CN paging or the RAN paging is monitored once within the first PTW by the inactive-state UE, stopping the monitoring of the paging within the first PTW.

As shown in FIG. 5, a distribution density of the inactive-state eDRX cycles in the time domain may be higher than that of the idle-state eDRX cycles. Therefore, in some cases, PTWs of some inactive-state eDRX cycles overlap with PTWs of the idle-state eDRX cycles in the time domain, while PTWs of some inactive-state eDRX cycles do not overlap with the PTWs of the idle-state eDRX cycles in the time domain. That is, part of the first PTWs and part of the second PTWs are overlapped in the time domain, while part of the second PTWs do not overlap with the first PTWs.

For the situation where there is no time-domain overlap between the first PTW and the second PTW, the paging monitoring is performed according to the second PTW included in the inactive-state eDRX cycle. That is, within the eDRX cycle where the second PTW having no time-domain overlap with the first PTW is located, the RAN paging is monitored according to the inactive-state eDRX parameter. That is, the RAN paging is monitored in the second PTW of the inactive-state eDRX cycle. Optionally, the monitoring cycle includes but is not limited to: a RAN paging cycle, and/or min (the RAN paging cycle, a default paging cycle). A monitoring object is the RAN paging.

As shown in FIG. 5, in the time domain, the second PTWs of some inactive-state eDRX cycles may overlap with the first PTWs of the idle-state eDRX cycles. According to a configuration specification between the second PTW in the inactive-state eDRX cycle and the first PTW in the idle-state eDRX cycle, a starting point of the first PTW and a starting point of the second PTW may be aligned. When the first PTW is less than the second PTW, there may be have certain anomalies in such configuration. The base station may eventually send the paging message within the first PTW. At this time, the inactive-state UE can monitor the paging message only in a time-domain position corresponding to the first PTW in the inactive-state eDRX cycle having the time-domain overlap with the idle-state eDRX cycle. This reduces unnecessary monitoring of the paging messages. It should be noted that a paging monitoring object can be the CN paging and/or the RAN paging.

In some cases, although the UE is in an inactive state, if the core network loses the context of the UE, the core network may also page the UE. This type of paging from the core network is called a CN paging. The CN paging is usually issued at a CN paging occasion in the first PTW according to the idle-state eDRX parameter. Therefore, in embodiments of the disclosure, both the CN paging and the RAN paging may be monitored in the first PTW in which the inactive-state eDRX cycle overlaps with the idle-state eDRX cycle in the time domain.

A monitoring cycle for monitoring the paging messages during the first PTW can be one of the following:

- a CN paging cycle, which can be equal to an idle-state DRX cycle within the first PTW;
- a RAN paging cycle;
- Min (the CN paging cycle, the RAN paging cycle, a default paging cycle);
- Min (the CN paging cycle, the RAN paging cycle).

In embodiments of the disclosure, when monitoring the paging message within the first PTW, if a CN paging and/or a RAN paging is monitored once, the monitoring of the paging message within the first PTW is stopped to reduce unnecessary monitoring.

Referring to FIG. 5, the second and the fourth PTW2 represented by squares filled with diagonal stripes are the inactive-state second PTWs that does not overlap with the first PTW in the time domain. In these second PTWs, the inactive-state UE can monitor the RAN paging only, so only the paging monitoring parameter for monitoring the RAN paging is determined. The first, third, and fifth second PTWs represented by squares without diagonal stripes are the second PTWs that have the time-domain overlap with the first PTW. In this case, the inactive-state UE may monitor both the CN paging and the RAN paging within the first PTW. Furthermore, in this case, an eDRX cycle of the inactive-state UE can continue to be the inactive-state eDRX cycle, and the inactive-state UE may monitor both the CN paging and the RAN paging within the first PTW during the inactive-state eDRX cycle.

For the inactive-state eDRX cycle corresponding to either type of PTW2 in FIG. 5, regardless of monitoring the paging within a time-domain position corresponding to the first PTW or within the second PTW during the inactive-state eDRX cycle, once a paging (e.g., the CN paging and/or the RAN paging) is monitored, the monitoring of the paging message within the time-domain position corresponding to the PTW may be stopped, thereby reducing unnecessary monitoring.

In some possible implementations, determining the paging monitoring parameter of the inactive-state UE according to the first PTW included in the idle-state eDRX parameter and the second PTW included in the inactive-state eDRX parameter includes:

- referring to FIG. 6, in response to the first PTW being greater than the second PTW and no time-domain overlap existing between the first PTW and the second PTW, determining a paging monitoring parameter for the inactive-state UE to monitor a RAN paging within the second PTW of the inactive-state eDRX cycle.

Referring to FIG. 6, the first PTW being greater than the second PTW means that a time-domain resource length of the first PTW is greater than a time-domain resource length of the second PTW. This can be understood as: determining the paging monitoring configuration for the inactive-state UE to monitor (only) the RAN paging within the second PTW that has no time-domain overlap with the first PTW.

One case is that the first PTW is greater than the second PTW, and there is a second PTW that overlaps with the first PTW in the time domain, and a second PTW that does not overlap with the first PTW in the time domain. In this case, monitoring the RAN paging is performed on the second PTW that does not overlap with the first PTW in the time domain. At this point, a monitoring time window defined by the paging monitoring parameter is the second PTW. At this point, a paging cycle defined by the determined paging monitoring parameter may be a RAN paging cycle, or Min (the RAN paging cycle, a default paging cycle). A monitoring object is a RAN paging. In a current eDRX cycle that does not overlap with the idle-state eDRX cycle, the core network does not issue a CN paging, so there is no need to monitor the CN paging or extend the monitoring time window, thereby reducing unnecessary monitoring.

In some embodiments, determining the paging monitoring parameter of the inactive-state UE according to the first PTW included in the idle-state eDRX parameter and the second PTW included in the inactive-state eDRX parameter includes at least one of:

- in response to the first PTW being greater than the second PTW and a time-domain overlap existing between the first PTW and the second PTW, determining a paging monitoring configuration for the inactive-state UE to monitor a CN paging and a RAN paging within the second PTW;
- in response to the first PTW being greater than the second PTW and the time-domain overlap existing between the first PTW and the second PTW, determining to stop the paging monitoring configuration of paging monitoring when the inactive-state UE monitors a CN paging or a RAN paging once within the second PTW;
- in response to the first PTW being greater than the second PTW and the time-domain overlap existing between the first PTW and the second PTW, determining a paging monitoring configuration for the inactive-state UE to monitor a CN paging and a RAN within the first PTW;
- in response to the first PTW being greater than the second PTW and the time-domain overlap existing between the first PTW and the second PTW, determining to stop the paging monitoring configuration of paging monitoring when the inactive-state UE monitors a CN paging or a RAN paging once within the first PTW;

in response to the first PTW being greater than the second PTW and the time-domain overlap existing between the first PTW and the second PTW, determining a paging monitoring configuration for the inactive-state UE to monitor a CN paging within a part of the first PTW not overlapping with the second PTW;

in response to the first PTW being greater than the second PTW and the time-domain overlap existing between the first PTW and the second PTW, determining to stop the paging monitoring configuration of paging monitoring when the inactive-state UE monitors a CN paging once within a part of the first PTW not overlapping with the second PTW;

In some embodiments, determining the paging monitoring parameter of the inactive-state UE according to the first PTW included in the idle-state eDRX parameter and the second PTW included in the inactive-state eDRX parameter including at least one of the following:

in response to the first PTW being greater than the second PTW and time-domain overlap existing between the first PTW and the second PTW, determining to stop the paging monitoring configuration of paging monitoring when the inactive-state UE monitors a CN paging or a RAN paging once within the second PTW of the inactive-state eDRX cycle;

in response to the first PTW being greater than the second PTW and time-domain overlap existing between the first PTW and the second PTW, determining to stop the paging monitoring configuration of paging monitoring when the inactive-state UE monitors a CN paging or a RAN paging once in a time-domain position corresponding to the first PTW in the inactive-state eDRX cycle;

in response to the first PTW being greater than the second PTW and a time-domain overlap existing between the first PTW and the second PTW, determining a paging monitoring configuration for the inactive-state UE to monitor a CN paging in a time-domain position corresponding to a part of the first PTW not overlapping with the second PTW in the inactive-state eDRX cycle;

in response to the first PTW being greater than the second PTW and a time-domain overlap existing between the first PTW and the second PTW, determining to stop the paging monitoring configuration of paging monitoring when the inactive-state UE monitors a CN paging once in a time-domain position corresponding to a part of the first PTW not overlapping with the second PTW in the inactive-state eDRX cycle.

In the case of the time-domain overlap existing between the first PTW and the second PTW, in addition to monitoring the CN paging and the RAN paging according to the second PTW in the time-domain overlap part between the first PTW and the second PTW, as the first PTW is larger than the second PTW, the UE may also continue monitoring the CN paging in the time-domain position corresponding to the part of the first PTW not overlapping with the second PTW in the time domain, so as to monitor various paging messages as much as possible. For example, if no CN paging and/or RAN paging is monitored in the second PTW, the UE may continue monitoring the CN paging within the part of the first PTW that does not overlap with the second PTW (i.e. it may continue to monitor the CN paging in the part other than the second PTW in the first PTW).

Certainly, if the CN paging and/or the RAN paging is monitored once within the time-domain overlap between the first PTW and the second PTW, the paging monitoring within the first PTW may be stopped to reduce unnecessary paging monitoring. Alternatively, if the CN paging and/or the RAN paging is monitored once within the time-domain overlap between the first PTW and the second PTW, only paging monitoring in the second PTW is stopped, and monitoring of the CN paging may be continued within the part of the first PTW that does not overlap with the second PTW.

Referring to FIG. 6, the inactive-state UE monitors both the CN paging and the RAN paging within the overlap between the first PTW and the second PTW, and continues to monitor the CN paging in the remaining portion of the first PTW that does not overlap with the second PTW.

When monitoring the paging, if one CN paging or one RAN paging is monitored within one PTW, paging monitoring of the corresponding PTW can be stopped. For example, if one CN paging or one RAN paging is monitored in the second PTW that has the time-domain overlap with the first PTW during the inactive-state eDRX cycle, paging monitoring in the corresponding second PTW or in the time position corresponding to entire the first PTW during the eDRX cycle is stopped.

In embodiments of the present disclosure, a monitoring cycle for monitoring the CN paging and the RAN paging in the second PTW within the inactive-state eDRX cycle that overlaps with the idle-state eDRX cycle in the time domain may include at least one of the following:

Min {a default paging cycle, a CN paging cycle (a UE-specific cycle), a RAN paging cycle}.

A monitoring cycle for monitoring the CN paging in a part of the first PTW not overlapping with the second PTW in the inactive-state eDRX cycle that overlaps with the idle-state eDRX cycle in the time domain may include one of the following:

a CN paging cycle (a UE-specific cycle);

Min {a default paging cycle, a CN paging cycle (a UE-specific cycle)}.

In embodiments of the present disclosure, the above paging monitoring parameter may be any parameter that indicates the paging monitoring cycle.

If the CN paging or the RAN paging is monitored once within the second PTW of the inactive-state eDRX cycle that overlaps with the idle-state eDRX cycle in the time domain, the paging monitoring within the inactive-state eDRX cycle is stopped.

If the CN paging is monitored once in the part of the first PTW not overlapping with the second PTW in the time domain in the inactive-state eDRX cycle, the paging monitoring in the inactive-state eDRX cycle is stopped.

In some embodiments, determining the paging monitoring parameter of the inactive-state UE according to the first PTW included in the idle-state eDRX parameter and the second PTW included in the inactive-state eDRX parameter includes at least one of the following:

in response to the first PTW being greater than the second PTW and a time-domain overlap existing between the first PTW and the second PTW, determining a paging monitoring configuration for the inactive-state UE to monitor a CN paging and a RAN paging within the first PTW;

in response to the first PTW being greater than the second PTW and a time-domain overlap existing between the first PTW and the second PTW, determining to stop the paging monitoring configuration of paging monitoring when the inactive-state UE monitors a CN paging or a RAN paging once in the first PTW.

In some embodiments, determining the paging monitoring parameter of the inactive-state UE according to the first PTW included in the idle-state eDRX parameter and the second PTW included in the inactive-state eDRX parameter includes at least one of the following:

in response to the first PTW being greater than the second PTW and a time-domain overlap existing between the first PTW and the second PTW, determining a paging monitoring configuration for the inactive-state UE to monitor a CN paging and a RAN paging within the first PTW;

in response to the first PTW being greater than the second PTW and a time-domain overlap existing between the first PTW and the second PTW, determining to stop the paging monitoring configuration of paging monitoring when the inactive-state UE monitors a CN paging or a RAN paging once within the first PTW;

in response to the first PTW being greater than the second PTW and a time-domain overlap existing between the first PTW and the second PTW, determining a paging monitoring configuration for the inactive-state UE to monitor a CN paging and a RAN paging within the first PTW of the idle-state eDRX cycle;

in response to the first PTW being greater than the second PTW and a time-domain overlap existing between the first PTW and the second PTW, determining to stop the paging monitoring configuration of paging monitoring when the inactive-state UE monitors a CN paging or a RAN paging once within the first PTW of the idle-state eDRX cycle.

The first PTW is greater than the second PTW, and there is an inactive-state eDRX cycle that overlaps with the idle-state eDRX cycle in the time domain. In this case, to simplify the operation, both the CN paging and the RAN paging are directly monitored in the time-domain position corresponding to the first PTW in the inactive-state eDRX cycle. At this point, the first PTW is a monitoring time window defined by the determined paging monitoring parameter. The monitoring object includes both the CN paging and/or the RAN paging. At this point, the paging cycle can be one of the following:

Min (a CN paging cycle, a RAN paging cycle, a default paging cycle);

Min (a CN paging cycle, a RAN paging cycle).

In this case, if the CN paging and/or the RAN paging is monitored within a first PTW of an inactive-state eDRX cycle that overlaps with the idle-state eDRX cycle in the time domain, monitoring the paging message within the first PTW is stopped, to reduce unnecessary paging monitoring.

In an embodiment, the idle-state eDRX parameter includes an idle-state eDRX cycle and the first PTW, and the inactive-state eDRX parameter includes an inactive-state eDRX cycle and the second PTW. When the idle-state eDRX cycle and the inactive-state eDXR cycle overlaps with the inactive-state eDXR cycle in the time domain, a time-domain starting point position of the first PTW and a time-domain starting point position of the second PTW are the same.

Therefore, if the first PTW is greater than the second PTW, the first PTW may contain the second PTW within the inactive-state eDRX cycle that overlaps with the idle-state eDRX cycle in the time domain. Embodiments of the disclosure provide a working method for an inactive-state UE to use the eDRX mechanism, in which the UE determines the paging monitoring parameter used in the inactive-state based on the eDRX parameter determined by the core network and/or the eDRX parameter determined by the base station. The paging monitoring parameter can also be abbreviated as a paging parameter.

The paging monitoring parameter includes: an eDRX cycle; and/or a PTW.

In an embodiment, the paging monitoring parameter may indicate a window length and a time-domain starting point position of the PTW.

In another embodiment, the paging monitoring parameters may indicate a time-domain starting position and a time-domain ending position of the PTW.

It can be understood that, if the base station does not provide at least one of the eDRX cycle or the PTW of the eDRX parameter, it means that the base station does not configure the eDRX parameter for the user. At this point, the UE performing paging monitoring according to the idle-state eDRX parameter. That is, the paging monitoring parameter is determined according to the idle-state eDRX parameter.

In an embodiment, if the base station provides the eDRX parameter only, but does not provide window information of the PTW, the UE may perform paging monitoring according to the idle-state eDRX. That is, the paging monitoring parameter is determined according to the idle-state eDRX parameter.

For example, the UE is configured or activated with an idle-state eDRX cycle, a PTW defined by the idle-state eDRX parameter can be called as an idle-state PTW. The idle-state PTW is PTW1. The UE may monitor the CN paging in the PTW1, and may monitor the RAN paging outside the PTW1.

For a UE in an idle state (i.e. an idle-state UE), the core network can provide an idle-state eDRX parameter to the UE. For a UE in an inactive-state, not only the core network provides an idle-state eDRX parameter to the user, but also the base station can provide an inactive-state eDRX parameter to the inactive-state UE. The idle-state eDRX parameter also refers to an eDRX parameter of an idle-state mode or a CN e-DRX parameter. The inactive-state eDRX parameter also refers to an eDRX parameter in an inactive mode or a RAN e-DRX parameter.

In an embodiment, if the base station does not provide the inactive-state eDRX parameter, the UE may perform paging monitoring based on only activating or configuring the idle-state eDRX parameter. The inactive-state eDRX parameter may include at least one of the inactive-state eDRX cycle and the inactive-state PTW.

In an embodiment, if the base station provides an eDRX cycle of the inactive-state eDRX parameter, which is greater than 10.24 seconds, but the base station does not provide a PTW of the inactive-state eDRX parameter, the UE may perform paging monitoring based on only activating the idle-state eDRX parameter or configuring the idle-state eDRX parameter. The activated idle-state eDRX parameter can be an activated (taking effect) idle-state eDRX parameter configured for UE.

In an embodiment, if the base station provides an eDRX cycle of the inactive-state eDRX parameter, which is greater than 10.24 seconds, but the base station does not provide a PTW of the inactive-state eDRX parameter, the UE may monitor the CN paging and the RAN paging within a PTW window of the CN. Outside the PTW, even if the base station provides an eDRX cycle of the inactive-state eDRX parameter, which is greater than 10.24 seconds (such as 20.48 seconds), the UE may still use the eDRX cycle rather than using the PTW. That is, only the PTW of the CN takes effect. In an embodiment, if the idle-state eDRX cycle provided by the core network is not greater than 10.24 seconds, the CN PTW may not be provided. In an embodiment, if the inactive-state eDRX cycle provided by the base station is not greater than 10.24 seconds, the RAN PTW may not be provided. In an embodiment, if the idle-state eDRX cycle provided by the core network is greater than 10.24 seconds, the CN PTW parameter may also be provided. In an embodiment, if the inactive-state eDRX cycle provided by the base station is greater than 10.24 seconds, the RAN PTW parameter may also be provided. In an embodiment, if the idle-state eDRX cycle provided by the core network is greater than 10.24 seconds, and if the CN PTW is not provided, the base station may not provide the inactive-state eDRX parameter, which means that the idle-state eDRX is not configured or activated. In an embodiment, if the idle-state eDRX cycle provided by the core network is greater than 10.24 seconds, and if the CN PTW is not provided, the base station may provide the eDRX cycle in the inactive-state eDRX parameter, but the base station does not provide the RAN PTW (i.e. the inactive-state PTW).

In this case, the eDRX cycle in the inactive-state eDRX parameter provided by the base station may not be greater than 10.24 seconds. When there is neither a CN PTW (i.e. the idle-state PTW) nor a RAN PTW, the UE may not use the PTW for paging monitoring. That is, the UE may perform monitoring according to Min {a CN eDRX cycle, a RAN eDRX cycle} or the RAN eDRX cycle. The CN eDRX cycle is an eDRX cycle defined by the idle-state eDRX parameter, and the RAN eDRX cycle is an eDRX cycle defined by the inactive-state eDRX parameter.

In one embodiment, when a window length of PTW2 provided by the base station and a window length of PTW1 provided by the core network are not equal, the inactive-state UE performs the following processing.

Scenario 1: the PTW2 provided by the base station is greater than the PTW1, that is, the window length of the PTW2 is greater than the window length of the PTW1.

Mode 1:

The inactive-state UE processes according to the fact that the base station does not configure the inactive-state eDRX parameter for the UE. That is, the paging monitoring parameter is determined according to the idle-state eDRX parameter. At this point, it can be considered that the configuration is an illegal configuration of the inactive-state eDRX.

In an embodiment, when the base station provides an inactive-state eDRX parameter, the PTW2 cannot be longer than the PTW1. That is, the PTW2 may be configured by using the PTW1 configured by the core network as auxiliary reference information. If the PTW2 is configured according to the PTW1, the PTW2 may be less than or equal to the PTW1. If the PTW2 is greater than PTW1, it may be considered an illegal configuration.

Mode 2:

- The inactive-state UE processes according to the fact that the base station configures the PTW1 for the user. That is, the UE truncates the configuration of the base station according to the configuration of the core network. In this case, the core network parameter is reused. At this time, a window length corresponding to the inactive-state eDRX cycle is also the PTW1;
- Within the PTW1 window of the inactive-state eDRX cycle, monitoring of the RAN paging is performed during the RAN paging cycle;
- Monitor of the CN paging is performed within the PTW1 window of the idle-state eDRX cycle;
- The above are cases where no time-domain overlap existing between the PTW1 and the PTW2. That is, monitoring of the RAN paging is performed in the PTW2 of the inactive-state eDRX cycle or in the PTW1, and monitoring of the CN paging performed in the PTW1 of the idle-state eDRX cycle.

If the PTW2 in the inactive-state eDRX and the PTW1 in the idle-state eDRX cycle overlap in the time domain, then both the monitoring of the CN paging and the monitoring of the RAN paging are performed during a time period corresponding to the PTW1.

It can be understood that the UE stops subsequent monitoring in the PTW1 window when the CN paging or the RAN paging once is monitored once by the UE.

Scenario 2: the PTW2 provided by the base station is less than the PTW1, that is, the window length of the PTW2 is less than the window length of the PTW1.

Mode 1:

Within the PTW2 window of the inactive-state eDRX cycle, monitoring of the RAN paging is performed according to the RAN paging cycle.

When the RAN paging is monitored once by the UE, the UE stops subsequent monitoring in the PTW2.

Monitoring of the CN paging is performed within the PTW1 window of the idle-state eDRX cycle. The UE stops subsequent monitoring in the PTW1 when the CN paging is monitored once by the UE.

The above are cases where there is no time-domain overlap between the PTW1 and the PTW2, that is, monitoring of the respective types of paging are performed separately.

If the time-domain overlap exists between the PTW2 in the inactive-state eDRX and the PTW1 in the idle-state eDRX cycle, monitoring of both the CN paging and the RAN paging are performed during a time period corresponding to the PTW2.

There are multiple ways to set the paging monitoring cycle. In an embodiment, the paging cycle can be: min {a default paging cycle, a UE-specific cycle, a RAN paging cycle}, and ultimately there are multiple ways to set the paging monitoring cycle. It can be understood that, when the CN paging or the RAN paging is monitored once by the UE, subsequent monitoring in the PTW2 window is stopped.

Furthermore, when the CN paging or the RAN paging is monitored once the UE, subsequent monitoring of the CN paging and RAN paging in the PTW1 window is stopped.

If there is a time-domain overlap between the PTW2 in the inactive-state eDRX cycle and the PTW1 in the idle-state eDRX cycle, monitoring of the CN paging is performed within a remaining PTW window outside of the time-domain overlap between the inactive-state eDRX cycle and the idle-state eDRX cycle, i.e. within a time-domain range defined by subtracting PTW2 from PTW1.

There are multiple ways to set the paging monitoring cycle. In an embodiment, the paging cycle can be min {a default paging cycle, a UE-specific cycle}, and the monitoring of the CN paging may be performed according to the min {the default paging cycle, the UE-specific cycle}.

It can be understood that at this point, if the CN paging is monitored once by the UE, subsequent monitoring in PTW is stopped.

Method 2:

Within the PTW2 window corresponding to the inactive-state eDRX cycle, monitoring of the RAN paging is performed according to the RAN paging cycle. Monitoring of the CN paging is performed within the PTW1 window of the idle-state eDRX cycle. UE stops subsequent monitoring in the PTW1 when the CN paging is monitored once.

The above are cases where there is no time-domain overlap between the PTW1 and the PTW2, i.e. monitoring of the respective types of paging are performed separately. In this case, monitoring of the RAN paging is performed within the PTW2 of the inactive-state eDRX cycle, and monitoring of the CN paging is performed within the PTW1 of the idle-state eDRX cycle.

There is a time-domain overlap between the PTW2 in the inactive-state eDRX cycle and the PTW1 in the idle-state eDRX cycle. In the PTW1 of the idle-state eDRX cycle, both the CN paging and the RAN paging are monitored. In an embodiment, a paging message of the CN paging or the RAN paging is monitored according to min {a default paging cycle, a UE-specific cycle, and a RAN paging cycle}.

Furthermore, when the CN paging or the RAN paging is monitored once by the UE, subsequent monitoring in the PTW1 window is stopped.

Compared to the previous mode, the processing in this mode is simpler when there is the time-domain overlap between the PTW2 in the inactive-state eDRX cycle and the PTW1 in the idle-state eDRX cycle. That is, the length of PTW1 is no longer divided into two parts for processing in two ways, and the PTW1 is processed in a unified manner. Both the monitoring of the CN paging and the monitoring of the RAN paging were performed within the entire PTW1 range.

In the technical solution provided in the embodiments of the disclosure, the terminal can perform an eDRX function in the inactive state. By performing the eDRX function, the terminal can effectively balance reachability and power consumption of the UE even in the inactive state.

Figure 7:
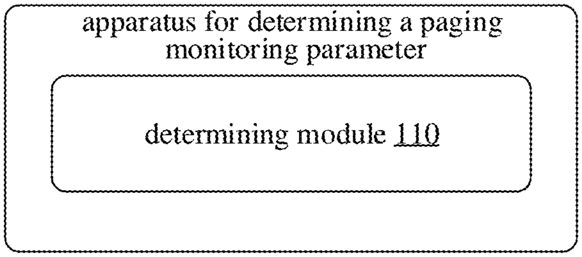
FIG. 7 is a block diagram illustrating an apparatus for determining a paging monitoring parameter according to an embodiment of the disclosure.

Referring to FIG. 7, embodiments of the disclosure provide an apparatus for determining a paging monitoring parameter. The apparatus includes:

a determining module 110, configured to determine a paging monitoring parameter of an inactive-state UE according to a configuration situation of an inactive-state eDRX parameter and an idle-state eDRX parameter.

The apparatus for determining a paging monitoring parameter may be included in a UE.

In some embodiments, the determining module 110 may be a program module. After the program module is executed by a processor, the paging monitoring parameter of an inactive-state UE can be determined according to the configuration situation of the inactive-state eDRX parameter and/or the idle-state eDRX parameter.

The paging monitoring parameter is determined for the UE to monitor paging of a network side. The paging of the network side includes but is not limited to: a CN paging and/or a RAN paging.

In other embodiments, the determining module 110 may be a module of a combination of software and hardware. The module of the combination of software and hardware includes but is not limited to various programmable arrays. The programmable array includes but is not limited to: a field programmable array and/or a complex programmable array.

In some other embodiments, the determining module 110 may be a pure hardware module. The pure hardware module includes but is not limited to: a dedicated integrated circuit.

In some embodiments, the determining module 110 is configured to perform at least one of the following:

in response to the idle-state eDRX parameter being configured and no inactive-state eDRX parameter being configured, determining the paging monitoring parameter of the inactive-state UE according to the idle-state eDRX parameter;

in response to the idle-state eDRX parameter being configured and the inactive-state eDRX parameter not including a paging time window (PTW), determining the paging monitoring parameter of the inactive-state UE according to the idle-state eDRX parameter;

in response to the idle-state eDRX parameter being configured and the inactive-state eDRX parameter being configured, determining the paging monitoring parameter of the inactive-state UE according to a first PTW included in the idle-state eDRX parameter and a second PTW included in the inactive-state eDRX parameter.

In some embodiments, the determining module 110 is configured to determine the paging monitoring parameter of the inactive-state UE according to the idle-state eDRX parameter in response to the first PTW being less than the second PTW.

In some embodiments, the inactive-state eDRX parameter includes an inactive-state eDRX cycle, the idle-state eDRX parameter includes an idle-state eDRX cycle.

The determining module 110 is further configured to perform at least one of the following:

in response to the first PTW being less than the second PTW and no time-domain overlap existing between the first PTW and the second PTW, determining a paging monitoring parameter for the inactive-state UE to monitor a RAN paging within a time-domain position corresponding to the first PTW in the inactive-state eDRX cycle;

in response to the first PTW being smaller than the second PTW and a time-domain overlap existing between the first PTW and the second PTW, determining a paging monitoring parameter for the inactive-state UE to monitor a CN paging and a RAN paging within the second PTW of the inactive-state eDRX cycle;

in response to the first PTW being smaller than the second PTW and a time-domain overlap existing between the first PTW and the second PTW, determining a paging monitoring parameter for the inactive-state UE to monitor a CN paging and a RAN paging within the first PTW;

in response to the first PTW being smaller than the second PTW and a time-domain overlap existing between the first PTW and the second PTW, determining a paging monitoring parameter for the inactive-state UE to stop monitoring the paging within the first PTW when the CN paging or the RAN paging is monitored once within the first PTW.

In some embodiments, the inactive-state eDRX parameter includes an inactive-state eDRX cycle, the idle-state eDRX parameter includes an idle-state eDRX cycle.

The determining module 110 is further configured to, in response to the first PTW being greater than the second PTW and no time-domain overlap existing between the first PTW and the second PTW, determine a paging monitoring configuration for the inactive-state UE to monitor a RAN paging within the second PTW of the inactive-state eDRX cycle.

In some embodiments, the inactive-state eDRX parameter includes an inactive-state eDRX cycle, the idle-state eDRX parameter includes an idle-state eDRX cycle.

The determining module 110 is further configured to perform at least one of the following:

in response to the first PTW being greater than the second PTW and a time-domain overlap existing between the first PTW and the second PTW, determining a paging monitoring configuration for the inactive-state UE to monitor a CN paging and a RAN paging within the second PTW of the inactive-state eDRX cycle;

in response to the first PTW being greater than the second PTW and a time-domain overlap existing between the first PTW and the second PTW, determining a paging monitoring configuration for the inactive-state UE to stop paging monitoring when a CN paging is monitored once or a RAN paging is monitored once within the second PTW of the inactive-state eDRX cycle;

in response to the first PTW being greater than the second PTW and a time-domain overlap existing between the first PTW and the second PTW, determining a paging monitoring configuration for the inactive-state UE to monitor a CN paging within a part of the first PTW not overlapping with the second PTW;

in response to the first PTW being greater than the second PTW and a time-domain overlap existing between the first PTW and the second PTW, determining a paging monitoring configuration for the inactive-state UE to stop paging monitoring when a CN paging is monitored once within a part of the first PTW not overlapping with the second PTW.

In some embodiments, the inactive-state eDRX parameter includes an inactive-state eDRX cycle, the idle-state eDRX parameter includes an idle-state eDRX cycle.

The determining module 110 is further configured to perform at least one of the following:

in response to the first PTW being greater than the second PTW and a time-domain overlap existing between the first PTW and the second PTW, determining a paging monitoring configuration for the inactive-state UE to monitor a CN paging and a RAN paging within the first PTW;

in response to the first PTW being greater than the second PTW and a time-domain overlap existing between the first PTW and the second PTW, determining a paging monitoring configuration for the inactive-state UE to stop paging monitoring when a CN paging is monitored once or a RAN paging is monitored once within the first PTW.

In some embodiments, the idle-state eDRX parameter includes an idle-state eDRX cycle and the first PTW, and the inactive-state eDRX parameter includes an inactive-state eDRX cycle and the second PTW. When the idle-state eDRX cycle overlaps with the inactive-state eDXR cycle in the time domain, a time-domain starting point position of the first PTW and a time-domain starting point position of the second PTW are the same.

Embodiments of the disclosure provide a communication device including:

a memory for storing instructions executable by a processor;

a processor, connected to the memory.

The processor is configured to perform the method for determining a paging monitoring parameter provided by any of the aforementioned technical solutions.

The processor may include various types of storage medium, which is non-transitory computer storage medium that can continue to remember and store information stored thereon after the communication device powers off.

The communication device includes a UE.

The processor can be connected to the memory via a bus or other means for reading executable programs stored on the memory, for example, reading at least one of the method shown in FIG. 4.

Figure 8:
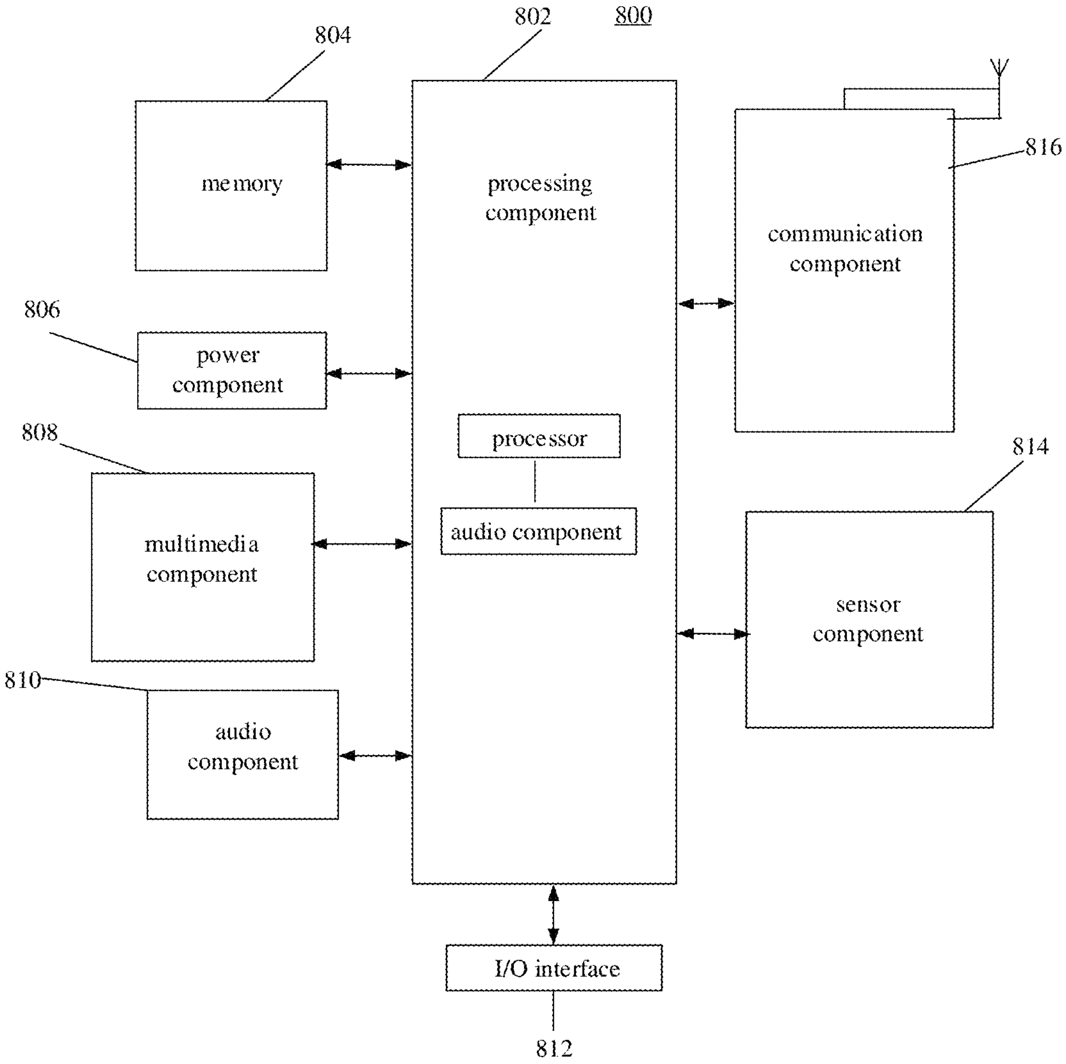
FIG. 8 is a schematic diagram illustrating a user equipment (UE) according to an embodiment of the disclosure.

FIG. 8 is a schematic diagram illustrating a UE 800 according to an embodiment of the disclosure. For example, the UE 800 may be a mobile phone, a computer, a digital broadcasting user device, a messaging device, a game console, a tablet device, a medical device, a fitness device, a personal digital assistant, etc.

As illustrated in FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communication, camera operations, and recording operations. The processing component 802 may include one or more processors 820 to execute instructions to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, videos, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or an optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each of the front-facing camera and the rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the UE 800, relative positioning of components, e.g., the display and the keypad, of the UE 800, a change in position of the UE 800 or a component of the UE 800, a presence or absence of a user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for using in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G, 3G, or a combination thereof. In an embodiment, the communication component 816 receives a broadcast signal from an external broadcast management system or broadcast associated information via a broadcast channel. In an embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the UE 800 may be implemented by at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a micro-controller, a microprocessor or other electronic components, for performing the above described method.

In the embodiments, there is also provided a computer storage medium including instructions. The computer storage medium may be a non-transitory computer readable storage medium, such as the memory 804. The instructions may be executed by the processor 820 in the UE 800 for performing the above method. For example, the non-transitory computer-readable storage medium may be a ROM, a Random Access Memory (RAM), a CD-ROM, a magnetic tape, a floppy disc, and an optical data storage device. In embodiments of the disclosure, after the instructions stored on the non-transitory storage medium are executed, the method for determining a paging monitoring parameter provided in any of the aforementioned embodiments can be implemented.

The method for determining a paging monitoring parameter may include: determining a paging monitoring parameter of an inactive-state UE according to a configuration situation of an inactive-state eDRX parameter and an idle-state eDRX parameter.

It can be understood that, determining the paging monitoring parameter of the inactive-state UE according to the configuration situation of the inactive-state eDRX parameter and the idle-state eDRX parameter includes at least one of the following: in response to the idle-state eDRX parameter being configured and no inactive-state eDRX parameter being configured, determining the paging monitoring parameter of the inactive-state UE according to the idle-state eDRX parameter; in response to the idle-state eDRX parameter being configured and the inactive-state eDRX parameter not including a paging time window (PTW), determining the paging monitoring parameter of the inactive-state UE according to the idle-state eDRX parameter; in response to the idle-state eDRX parameter being configured and the inactive-state eDRX parameter being configured, determining the paging monitoring parameter of the inactive-state UE according to a first PTW included in the idle-state eDRX parameter and a second PTW included in the inactive-state eDRX parameter.

It can be understood that, determining the paging monitoring parameter of the inactive-state UE according to the first PTW included in the idle-state eDRX parameter and the second PTW included in the inactive-state eDRX parameter includes:

determining the paging monitoring parameter of the inactive-state UE according to the idle-state eDRX parameter in response to the first PTW being less than the second PTW.

It can be understood that, determining the paging monitoring parameter of the inactive-state UE according to the first PTW included in the idle-state eDRX parameter and the second PTW included in the inactive-state eDRX parameter includes at least one of the following: in response to the first PTW being less than the second PTW and no time-domain overlap existing between the first PTW and the second PTW, determining a paging monitoring parameter for the inactive-state UE to monitor a RAN paging within the second PTW of the inactive-state eDRX cycle; in response to the first PTW being less than the second PTW and a time-domain overlap existing between the first PTW and the second PTW, determining a paging monitoring parameter for the inactive-state UE to monitor a CN paging and a RAN paging within the first PTW; in response to the first PTW being less than the second PTW and a time-domain overlap existing between the first PTW and the second PTW, determining a paging monitoring parameter for the inactive-state UE to stop monitoring the paging within the first PTW when a CN paging or a RAN paging is monitored once within the first PTW.

It can be understood that, determining a paging monitoring parameter of the inactive-state UE according to the first PTW included in the idle-state eDRX parameter and the second PTW included in the inactive-state eDRX parameter includes: in response to the first PTW being greater than the second PTW and no time-domain overlap existing between the first PTW and the second PTW, determining a paging monitoring configuration for the inactive-state UE to monitor a RAN paging within the second PTW of the inactive-state eDRX cycle.

It can be understood that, determining the paging monitoring parameter of the inactive-state UE according to the first PTW included in the idle-state eDRX parameter and the second PTW included in the inactive-state eDRX parameter includes at least one of the following: in response to the first PTW being greater than the second PTW and a time-domain overlap existing between the first PTW and the second PTW, determining a paging monitoring configuration for the inactive-state UE to monitor a CN paging and a RAN paging within the second PTW of the inactive-state eDRX cycle; in response to the first PTW being greater than the second PTW and a time-domain overlap existing between the first PTW and the second PTW, determining a paging monitoring configuration for the inactive-state UE to stop paging monitoring when a CN paging is monitored once or a RAN paging is monitored once within the second PTW; in response to the first PTW being greater than the second PTW and a time-domain overlap existing between the first PTW and the second PTW, determining a paging monitoring configuration for the inactive-state UE to stop paging monitoring when a CN paging is monitored once or a RAN paging is monitored once within the first PTW; in response to the first PTW being greater than the second PTW and a time-domain overlap existing between the first PTW and the second PTW, determining a paging monitoring configuration for the inactive-state UE to monitor a CN paging within a part of the first PTW not overlapping with the second PTW; in response to the first PTW being greater than the second PTW and a time-domain overlap existing between the first PTW and the second PTW, determining a paging monitoring configuration for the inactive-state UE to stop paging monitoring when a CN paging is monitored once within a part of the first PTW not overlapping with the second PTW.

It can be understood that, determining the paging monitoring parameter of the inactive-state UE according to the first PTW included in the idle-state eDRX parameter and the second PTW included in the inactive-state eDRX parameter includes at least one of the following: in response to the first PTW being greater than the second PTW and a time-domain overlap existing between the first PTW and the second PTW, determining a paging monitoring configuration for the inactive-state UE to monitor a CN paging and a RAN paging within the first PTW; in response to the first PTW being greater than the second PTW and a time-domain overlap existing between the first PTW and the second PTW, determining a paging monitoring configuration for the inactive-state UE to stop paging monitoring when a CN paging is monitored once or a RAN paging is monitored once within the first PTW.

It can be understood that, the idle-state eDRX parameter includes an idle-state eDRX cycle and the first PTW, the inactive-state eDRX parameter includes an inactive-state eDRX cycle and the second PTW. When the idle-state eDRX cycle overlaps with the inactive-state eDXR cycle in a time domain, a time-domain starting point position of the first PTW and a time-domain starting point position of the second PTW are the same.

Other embodiments of the disclosure will be apparent to those skilled in the art from consideration of the specification and practice of the disclosure disclosed here. This disclosure is intended to cover any variations, usages, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a paging monitoring parameter, performed by a user equipment (UE), comprising:
- determining a paging monitoring parameter of an inactive-state UE according to a configuration situation of an inactive-state extended Discontinuous Reception (eDRX) parameter and an idle-state eDRX parameter; and
- in response to the idle-state eDRX parameter being configured and the inactive-state eDRX parameter being configured, determining the paging monitoring parameter of the inactive-state UE according to a first paging time window (PTW) included in the idle-state eDRX parameter and a second PTW included in the inactive-state eDRX parameter;
- wherein the inactive-state eDRX parameter comprises an inactive-state eDRX cycle, the idle-state eDRX parameter comprises an idle-state eDRX cycle; and
- determining the paging monitoring parameter of the inactive-state UE according to the first PTW included in the idle-state eDRX parameter and the second PTW included in the inactive-state eDRX parameter comprises at least one of:
- in response to the first PTW being less than the second PTW and no time-domain overlap existing between the first PTW and the second PTW, determining the paging monitoring parameter for the inactive-state UE to monitor a radio access network (RAN) paging within the second PTW of the inactive-state eDRX cycle:
- in response to the first PTW being less than the second PTW and a time-domain overlap existing between the first PTW and the second PTW, determining the paging monitoring parameter for the inactive-state UE to monitor a core network (CN) paging and a RAN paging within the first PTW; or
- in response to the first PTW being less than the second PTW and a time-domain overlap existing between the first PTW and the second PTW, determining the paging monitoring parameter for the inactive-state UE to stop monitoring the paging within the first PTW when a CN paging or a RAN paging is monitored within the first PTW.

2. The method according to claim 1, wherein determining the paging monitoring parameter of the inactive-state UE according to the configuration situation of the inactive-state eDRX parameter and the idle-state eDRX parameter further comprises at least one of:
- in response to the idle-state eDRX parameter being configured and no inactive-state eDRX parameter being configured, determining the paging monitoring parameter of the inactive-state UE according to the idle-state eDRX parameter; or
- in response to the idle-state eDRX parameter being configured and the inactive-state eDRX parameter not including a PTW, determining the paging monitoring parameter of the inactive-state UE according to the idle-state eDRX parameter.

3. The method according to claim 2, wherein the idle-state eDRX parameter comprises an idle-state eDRX cycle and the first PTW, and the inactive-state eDRX parameter comprises an inactive-state eDRX cycle and the second PTW; and
- when the idle-state eDRX cycle overlaps with the inactive-state eDRX cycle in a time domain, a time-domain starting point position of the first PTW and a time-domain starting point position of the second PTW are the same.

4. The method according to claim 1, wherein determining the paging monitoring parameter of the inactive-state UE according to the first PTW included in the idle-state eDRX parameter and the second PTW included in the inactive-state eDRX parameter comprises:

determining the paging monitoring parameter of the inactive-state UE according to the idle-state eDRX parameter in response to the first PTW being less than the second PTW.

5. The method according to claim 1, wherein the inactive-state eDRX parameter comprises an inactive-state eDRX cycle, the idle-state eDRX parameter comprises an idle-state eDRX cycle; and determining the paging monitoring parameter of the inactive-state UE according to the first PTW included in the idle-state eDRX parameter and the second PTW included in the inactive-state eDRX parameter comprises:

in response to the first PTW being greater than the second PTW and no time-domain overlap existing between the first PTW and the second PTW, determining the paging monitoring parameter for the inactive-state UE to monitor a RAN paging within the second PTW of the inactive-state eDRX cycle.

6. The method according to claim 1, wherein the inactive-state eDRX parameter comprises an inactive-state eDRX cycle, the idle-state eDRX parameter comprises an idle-state eDRX cycle; and determining the paging monitoring parameter of the inactive-state UE according to the first PTW included in the idle-state eDRX parameter and the second PTW included in the inactive-state eDRX parameter comprises at least one of:

in response to the first PTW being greater than the second PTW and a time-domain overlap existing between the first PTW and the second PTW, determining the paging monitoring parameter for the inactive-state UE to monitor a CN paging and a RAN paging within the second PTW;

in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the second PTW;

in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the first PTW;

in response to the first PTW being greater than the second PTW and a time-domain overlap existing between the first PTW and the second PTW, determining the paging monitoring parameter for the inactive-state UE to monitor a CN paging within a part of the first PTW not overlapping with the second PTW; or in response to the first PTW being greater than the second PTW and a time-domain overlap existing between the first PTW and the second PTW, determining the paging monitoring parameter for the inactive-state UE to stop paging monitoring when a CN paging is monitored once within a part of the first PTW not overlapping with the second PTW.

7. The method according to claim 1, wherein the inactive-state eDRX parameter comprises an inactive-state eDRX cycle, the idle-state eDRX parameter comprises an idle-state eDRX cycle; and determining the paging monitoring parameter of the inactive-state UE according to the first PTW included in the idle-state eDRX parameter and the second PTW included in the inactive-state eDRX parameter comprises at least one of:

in response to the first PTW being greater than the second PTW and a time-domain overlap existing between the first PTW and the second PTW, determining the paging monitoring parameter for the inactive-state UE to monitor a CN paging and a RAN paging within the first PTW; or in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the first PTW.

8. A communication device, comprising:

a processor; and a memory storing a program executable by the processor, wherein the processor is configured to:

determine a paging monitoring parameter of an inactive-state user equipment (UE) according to a configuration situation of an inactive-state extended Discontinuous Reception (eDRX) parameter and an idle-state eDRX parameter; and in response to the idle-state eDRX parameter being configured and the inactive-state eDRX parameter being configured, determine the paging monitoring parameter of the inactive-state UE according to a first paging time window (PTW) included in the idle-state eDRX parameter and a second PTW included in the inactive-state eDRX parameter;

wherein the inactive-state eDRX parameter comprises an inactive-state eDRX cycle, the idle-state eDRX parameter comprises an idle-state eDRX cycle; and determining the paging monitoring parameter of the inactive-state UE according to the first PTW included in the idle-state eDRX parameter and the second PTW included in the inactive-state eDRX parameter comprises at least one of:

in response to the first PTW being less than the second PTW and no time-domain overlap existing between the first PTW and the second PTW, determining the paging monitoring parameter for the inactive-state UE to monitor a radio access network (RAN) paging within the second PTW of the inactive-state eDRX cycle;

in response to the first PTW being less than the second PTW and a time-domain overlap existing between the first PTW and the second PTW, determining the paging monitoring parameter for the inactive-state UE to monitor a core network (CN) paging and a RAN paging within the first PTW; or in response to the first PTW being less than the second PTW and a time-domain overlap existing between the first PTW and the second PTW, determining the paging monitoring parameter for the inactive-state UE to stop monitoring the paging within the first PTW when a CN paging or a RAN paging is monitored within the first PTW.

9. The communication device according to claim 8, wherein the processor is further configured to perform at least one of:

in response to the idle-state eDRX parameter being configured and no inactive-state eDRX parameter being configured, determining the paging monitoring parameter of the inactive-state UE according to the idle-state eDRX parameter;

in response to the idle-state eDRX parameter being configured and the inactive-state eDRX parameter not including a PTW, determining the paging monitoring parameter of the inactive-state UE according to the idle-state eDRX parameter; or in response to the idle-state eDRX parameter being configured and the inactive-state eDRX parameter being configured, determining the paging monitoring parameter of the inactive-state UE according to a first PTW included in the idle-state eDRX parameter and a second PTW included in the inactive-state eDRX parameter.

10. The communication device according to claim 9, wherein the processor is further configured to:

determine the paging monitoring parameter of the inactive-state UE according to the idle-state eDRX parameter in response to the first PTW being less than the second PTW.

11. The communication device according to claim 9, wherein the inactive-state eDRX parameter comprises an inactive-state eDRX cycle, the idle-state eDRX parameter comprises an idle-state eDRX cycle; and the processor is further configured to perform at least one of:

in response to the first PTW being less than the second PTW and no time-domain overlap existing between the first PTW and the second PTW, determining the paging monitoring parameter for the inactive-state UE to monitor a RAN paging within the second PTW of the inactive-state eDRX cycle;

in response to the first PTW being less than the second PTW and a time-domain overlap existing between the first PTW and the second PTW, determining the paging monitoring parameter for the inactive-state UE to monitor a CN paging and a RAN paging within the first PTW; or in response to the first PTW being less than the second PTW and a time-domain overlap existing between the first PTW and the second PTW, determining the paging monitoring parameter for the inactive-state UE to stop monitoring the paging within the first PTW when a CN paging or a RAN paging is monitored once within the first PTW.

12. The communication device according to claim 9, wherein the inactive-state eDRX parameter comprises an inactive-state eDRX cycle, the idle-state eDRX parameter comprises an idle-state eDRX cycle; and the processor is further configured to:

in response to the first PTW being greater than the second PTW and no time-domain overlap existing between the first PTW and the second PTW, determine the paging monitoring parameter for the inactive-state UE to monitor a RAN paging within the second PTW of the inactive-state eDRX cycle.

13. The communication device according to claim 9, wherein the inactive-state eDRX parameter comprises an inactive-state eDRX cycle, the idle-state eDRX parameter comprises an idle-state eDRX cycle; and the processor is further configured to perform at least one of:

in response to the first PTW being greater than the second PTW and a time-domain overlap existing between the first PTW and the second PTW, determining the paging monitoring parameter for the inactive-state UE to monitor a CN paging and a RAN paging within the second PTW;

in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the second PTW;

in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the first PTW;

in response to the first PTW being greater than the second PTW and a time-domain overlap existing between the first PTW and the second PTW, determining the paging monitoring parameter for the inactive-state UE to monitor a CN paging within a part of the first PTW not overlapping with the second PTW; or in response to the first PTW being greater than the second PTW and a time-domain overlap existing between the first PTW and the second PTW, determining the paging monitoring parameter for the inactive-state UE to stop paging monitoring when a CN paging is monitored once within a part of the first PTW not overlapping with the second PTW.

14. The communication device according to claim 9, wherein the inactive-state eDRX parameter comprises an inactive-state eDRX cycle, the idle-state eDRX parameter comprises an idle-state eDRX cycle; and the processor is further configured to perform at least one of:

in response to the first PTW being greater than the second PTW and a time-domain overlap existing between the first PTW and the second PTW, determining the paging monitoring parameter for the inactive-state UE to monitor a CN paging and a RAN paging within the first PTW; or in response to the first PTW being greater than the second PTW and a time-domain overlap existing between the first PTW and the second PTW, determining the paging monitoring parameter for the inactive-state UE to stop paging monitoring when a CN paging is monitored once or a RAN paging is monitored once within the first PTW.

15. The communication device according to claim 9, wherein the idle-state eDRX parameter comprises an idle-state eDRX cycle and the first PTW, and the inactive-state eDRX parameter comprises an inactive-state eDRX cycle and the second PTW; and when the idle-state eDRX cycle overlaps with the inactive-state eDRXeDXR cycle in a time domain, a time-domain starting point position of the first PTW and a time-domain starting point position of the second PTW are the same.

16. A non-transitory computer storage medium having stored thereon an executable program that, when executed by a processor, causes the processor to perform a method for determining a paging monitoring parameter, the method comprising:

determining a paging monitoring parameter of an inactive-state user equipment (UE) according to a configuration situation of an inactive-state extended Discontinuous Reception (eDRX) parameter and an idle-state eDRX parameter; and in response to the idle-state eDRX parameter being configured and the inactive-state eDRX parameter being configured, determining the paging monitoring parameter of the inactive-state UE according to a first paging time window (PTW) included in the idle-state eDRX parameter and a second PTW included in the inactive-state eDRX parameter;

wherein the inactive-state eDRX parameter comprises an inactive-state eDRX cycle, the idle-state eDRX parameter comprises an idle-state eDRX cycle; and determining the paging monitoring parameter of the inactive-state UE according to the first PTW included in the idle-state eDRX parameter and the second PTW included in the inactive-state eDRX parameter comprises at least one of:

in response to the first PTW being less than the second PTW and no time-domain overlap existing between the first PTW and the second PTW, determining the paging monitoring parameter for the inactive-state UE to monitor a radio access network (RAN) paging within the second PTW of the inactive-state eDRX cycle;

in response to the first PTW being less than the second PTW and a time-domain overlap existing between the first PTW and the second PTW, determining the paging monitoring parameter for the inactive-state UE to monitor a core network (CN) paging and a RAN paging within the first PTW; or in response to the first PTW being less than the second PTW and a time-domain overlap existing between the first PTW and the second PTW, determining the paging monitoring parameter for the inactive-state UE to stop monitoring the paging within the first PTW when a CN paging or a RAN paging is monitored within the first PTW.

17. The non-transitory computer storage medium according to claim 16, wherein the processor is further configured to perform at least one of:

in response to the idle-state eDRX parameter being configured and no inactive-state eDRX parameter being configured, determining the paging monitoring parameter of the inactive-state UE according to the idle-state eDRX parameter;

in response to the idle-state eDRX parameter being configured and the inactive-state eDRX parameter not including a PTW, determining the paging monitoring parameter of the inactive-state UE according to the idle-state eDRX parameter; or in response to the idle-state eDRX parameter being configured and the inactive-state eDRX parameter being configured, determining the paging monitoring parameter of the inactive-state UE according to a first PTW included in the idle-state eDRX parameter and a second PTW included in the inactive-state eDRX parameter.

18. The non-transitory computer storage medium according to claim 17, wherein the processor is further configured to:

determine the paging monitoring parameter of the inactive-state UE according to the idle-state eDRX parameter in response to the first PTW being less than the second PTW.

19. The non-transitory computer storage medium according to claim 17, wherein the inactive-state eDRX parameter comprises an inactive-state eDRX cycle, the idle-state eDRX parameter comprises an idle-state eDRX cycle; and the processor is further configured to perform at least one of:

in response to the first PTW being less than the second PTW and no time-domain overlap existing between the first PTW and the second PTW, determining the paging monitoring parameter for the inactive-state UE to monitor a RAN paging within the second PTW of the inactive-state eDRX cycle;

in response to the first PTW being less than the second PTW and a time-domain overlap existing between the first PTW and the second PTW, determining the paging monitoring parameter for the inactive-state UE to monitor a CN paging and a RAN paging within the first PTW; or in response to the first PTW being less than the second PTW and a time-domain overlap existing between the first PTW and the second PTW, determining the paging monitoring parameter for the inactive-state UE to stop monitoring the paging within the first PTW when a CN paging or a RAN paging is monitored once within the first PTW.

* * * * *